S. LLOYD.
VALVES.
No. 195,294.  Patented Sept. 18, 1877.
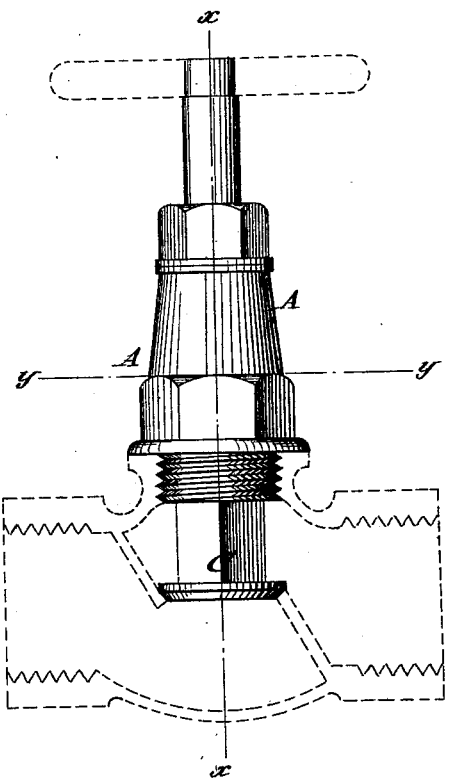
Fig. 1.
Fig. 3.
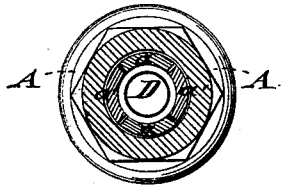
Fig. 2.
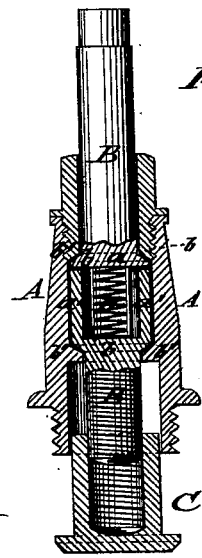
WITNESSES:
H. Rydquist
J. H. Scarborough
INVENTOR:
S. Lloyd
BY
ATTORNEYS.

UNITED STATES PATENT OFFICE.

SETH LLOYD, OF CONSHOHOCKEN, PENNSYLVANIA.

IMPROVEMENT IN VALVES.

Specification forming part of Letters Patent No. 195,294, dated September 18, 1877; application filed May 5, 1877.

*To all whom it may concern:*

Be it known that I, SETH LLOYD, of Conshohocken, in the county of Montgomery and State of Pennsylvania, have invented a new and Improved Valve, of which the following is a specification:

In the accompanying drawing, Figure 1 represents a side elevation of my improved valve; Fig. 2, a vertical central section, and Fig. 3 a horizontal section, of the same on line $y\ y$, Fig. 1.

Similar letters of reference indicate corresponding parts.

Hitherto it has been the experience in valves for steam and water pipes that by the frequent screwing and unscrewing of the same the screw portions are worn out while the other parts of the valves are still in good condition. The valves need, also, repacking from time to time, which is troublesome and expensive. Valves are also frequently placed at points which are reached only with difficulty for the purpose of packing.

Now, the object of my invention is to furnish a valve with improved stem, that produces a steam or water tight fitting without requiring any packing for the stuffing-box, and which has no parts that wear out by use, being capable of application directly for use as they are furnished by the manufacturer.

The invention consists of a compound and spring-acted valve-stem, of which the upper handle-section is connected to the lower valve-operating section by a kind of coupling or clutch, both sections having conical valves that are forced by an interposed spring against seats of the casing or box to produce the tight fitting of the stem.

In the drawing, A represents the outer surrounding casing or box of the valve-stem B, which box is screwed tightly into its seat on the water or steam pipe, guiding at the lower part the valve C.

The valve-stem B is made of two sections—an upper handle-section and a lower section, that screws, by its threaded stem, into the interiorly-threaded valve C, so as to raise or lower the same on its seat in the water or steam pipe.

The upper and lower sections of valve-stem B are provided with interlocking lugs $a\ a'$, that form a coupling or clutch, as shown in Figs. 2 and 3, so that by turning the upper handle-section the valve is readily worked.

Both sections of the stem B are provided with conical valves $b$, that are forced against seats $b'$ of the casing A by a spiral or other spring, D, which is interposed between the section, and placed at the interior of the space formed by the interlocking lugs. The spring D keeps each stem-valve tightly on its seat, and produces the steam and water tight closing of the valve-stem and casing without the use of any packing, so as to prevent leakage and be capable of resisting a considerable pressure.

The valve is ready to be screwed into its seat without the least difficulty, being furnished ready for use by the manufacturer, and forming a convenient and reliable closing-stem for stop-valves of all kinds.

Having thus described my invention, I claim as new and desire to secure by Letters Patent—

The combination of the upper and lower sections of the valve-stem B, having interlocking lugs $a\ a'$ and outer valves $b$, with the seats $b'$ of the stem casing or box A, and with the interposed interior spring D, substantially as specified.

SETH LLOYD.

Witnesses:
JOHN T. LLOYD,
ADDISON LINDSAY.